United States Patent
France

(10) Patent No.: US 12,384,207 B2
(45) Date of Patent: Aug. 12, 2025

(54) CENTRAL TIRE INFLATION SYSTEM

(71) Applicant: Toyota Motor Engineering & Manufacturing North America, Inc., Plano, TX (US)

(72) Inventor: Aaron France, Westland, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 410 days.

(21) Appl. No.: 16/752,340

(22) Filed: Jan. 24, 2020

(65) Prior Publication Data

US 2021/0229506 A1 Jul. 29, 2021

(51) Int. Cl.
*B60C 23/00* (2006.01)

(52) U.S. Cl.
CPC .......... *B60C 23/003* (2013.01); *B60C 23/002* (2013.01)

(58) Field of Classification Search
CPC ............................ B60C 23/003; B60C 23/002
USPC .......................................................... 701/36
See application file for complete search history.

(56) References Cited

U.S. PATENT DOCUMENTS

| | | | | |
|---|---|---|---|---|
| 4,293,017 A * | 10/1981 | Lambe | ...................... | B60C 5/22 |
| | | | | 152/518 |
| 4,640,331 A * | 2/1987 | Braun | ............... | B60C 23/00354 |
| | | | | 152/416 |
| 5,325,902 A * | 7/1994 | Loewe | .................. | B60C 23/004 |
| | | | | 152/418 |
| 5,540,268 A * | 7/1996 | Mittal | ............... | B60C 23/00363 |
| | | | | 152/415 |
| 6,067,850 A | 5/2000 | Lang et al. | | |
| 6,144,295 A * | 11/2000 | Adams | .............. | B60C 23/00354 |
| | | | | 137/224 |
| 6,212,464 B1 | 4/2001 | Skotnikov | | |
| 7,472,914 B2 | 1/2009 | Anderson et al. | | |
| 8,032,281 B2 * | 10/2011 | Bujak | ................... | B60C 23/002 |
| | | | | 303/157 |
| 8,589,049 B2 * | 11/2013 | Craig | .................... | B60W 40/02 |
| | | | | 701/80 |
| 9,116,782 B2 * | 8/2015 | Pierfelice | ........... | B60G 17/0165 |

(Continued)

FOREIGN PATENT DOCUMENTS

KR 20150044433 A * 4/2015

OTHER PUBLICATIONS

Enabling unmanned capabilities in the tactical wheeled vehicle fleet of the future.

(Continued)

*Primary Examiner* — Dino Kujundzic
(74) *Attorney, Agent, or Firm* — Snell & Wilmer LLP

(57) ABSTRACT

Methods and systems for adjusting air pressure of one or more tires of a vehicle. The system includes one or more valves respectively corresponding to the one or more tires, each valve of the one or more valves configured to receive air for inflating a corresponding tire or release air for deflating the corresponding tire. The system includes an air regulation device configured to provide air to the one or more valves of the one or more tires via one or more respective air lines and provide air to one or more air suspension devices via the one or more respective air lines. The system includes an electronic control unit (ECU) configured to cause the one or more tires to inflate or deflate based on a tire air pressure configuration.

20 Claims, 6 Drawing Sheets

(56) References Cited

U.S. PATENT DOCUMENTS

| | | | |
|---|---|---|---|
| 9,751,372 | B2 | 9/2017 | Traut |
| 9,884,522 | B2 | 2/2018 | King et al. |
| 10,266,017 | B2 | 4/2019 | Ornella et al. |
| 10,315,469 | B2* | 6/2019 | Coombs ............ B60C 23/00318 |
| 2009/0289426 | A1* | 11/2009 | Oscarsson ......... B60C 23/00354 |
| | | | 280/5.503 |
| 2011/0175716 | A1* | 7/2011 | Medley ............ B60C 23/00363 |
| | | | 152/427 |
| 2012/0221196 | A1* | 8/2012 | Seymour ............... B60C 23/002 |
| | | | 701/36 |
| 2013/0000295 | A1* | 1/2013 | Bissontz ............... B60W 10/30 |
| | | | 60/409 |
| 2013/0282232 | A1* | 10/2013 | Medley ................ B60C 23/002 |
| | | | 152/427 |
| 2015/0005982 | A1* | 1/2015 | Muthukumar ........ B60T 8/1725 |
| | | | 701/1 |
| 2015/0316437 | A1* | 11/2015 | Lacey ..................... G01L 17/00 |
| | | | 73/146.8 |
| 2016/0025598 | A1* | 1/2016 | Okada ................ G05D 16/2024 |
| | | | 73/146 |
| 2017/0080761 | A1* | 3/2017 | King ................. B60C 23/00372 |
| 2017/0225535 | A1* | 8/2017 | Batsch ............... B60G 17/0195 |
| 2017/0259641 | A1* | 9/2017 | Ohashi ................. B60G 17/052 |
| 2018/0029432 | A1* | 2/2018 | Kondo ............... B60G 17/0162 |
| 2018/0170125 | A1* | 6/2018 | Woodley ........... B60C 23/00318 |
| 2018/0268703 | A1* | 9/2018 | Kang ................ B60W 50/0098 |
| 2018/0312018 | A1* | 11/2018 | Wilson .................... B60S 5/046 |
| 2019/0095519 | A1* | 3/2019 | Park ..................... G05B 19/042 |
| 2019/0308471 | A1* | 10/2019 | Fiorati ............... B62D 49/0621 |
| 2020/0285953 | A1* | 9/2020 | Samples ............. G06V 10/764 |

OTHER PUBLICATIONS

The Army's Vehicle Intelligence Program (AVIP): Bringing Telematics to the 21st Century Truck.

\* cited by examiner

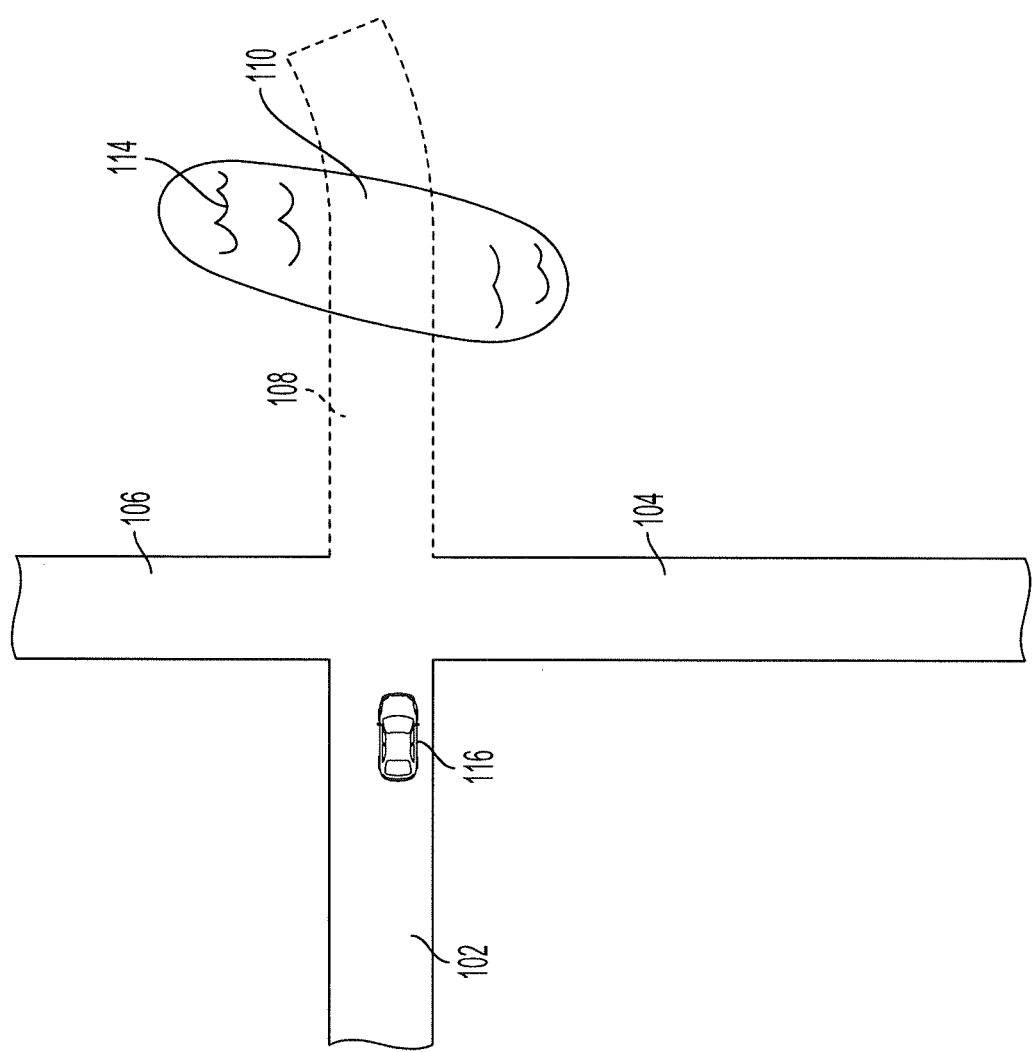

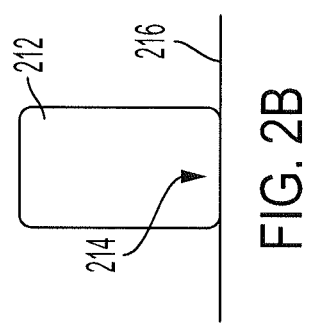
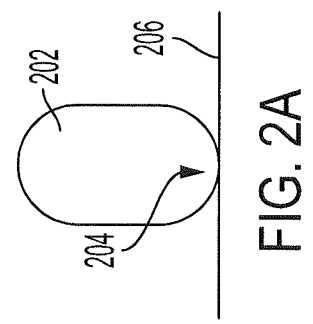

CENTRAL TIRE INFLATION SYSTEM

BACKGROUND

1. Field

This specification relates to a system and a method for dynamically adjusting tire pressure of vehicle tires.

2. Description of the Related Art

Vehicles may include a plurality of tires turned by an axle operatively connected to the vehicle engine or motor. The plurality of tires may be made of rubber and filled with air. The air within the tires allows the tires to absorb some deformities in the road, and the rubber tires allow for contact with the road, to maintain stability and control. The air pressure within the tire (sometimes referred to as "tire pressure") may be adjusted by adding or removing air to a tire. Air may be added or removed from a tire via a valve connected to the inner cavity of a tire. Air may be added using an air pump, and air may be removed by engaging the valve to release air within the inner cavity of the tire.

Conventionally, when a driver of the vehicle desires to add or remove air, the driver of the vehicle manually connects an air pump or air releasing tool to the valve to add or remove air, respectively. The amount of air added or removed may be imprecise, as the driver may lack the information and tools having sufficient precision to control the air pressure of the tires of the vehicle. Thus, there is a need for improved tire air pressure monitoring systems.

SUMMARY

What is described is a system for adjusting air pressure of one or more tires of a vehicle. The system includes one or more valves respectively corresponding to the one or more tires, each valve of the one or more valves configured to receive air for inflating a corresponding tire or release air for deflating the corresponding tire. The system includes an air regulation device configured to provide air to the one or more valves of the one or more tires via one or more respective air lines and provide air to one or more air suspension devices via the one or more respective air lines. The system includes an electronic control unit (ECU) configured to cause the one or more tires to inflate or deflate based on a tire air pressure configuration.

Also described is a vehicle having one or more tires. The vehicle includes one or more valves respectively corresponding to the one or more tires, each valve of the one or more valves configured to receive air for inflating a corresponding tire or release air for deflating the corresponding tire. The vehicle also includes an air regulation device configured to provide air to the one or more valves of the one or more tires via one or more respective air lines and provide air to one or more air suspension devices via the one or more respective air lines. The vehicle also includes an electronic control unit (ECU) configured to cause the one or more tires to inflate or deflate based on a tire air pressure configuration.

Also described is a method for adjusting air pressure of one or more tires of a vehicle having one or more valves respectively corresponding to the one or more tires, each valve of the one or more valves configured to receive air for inflating a corresponding tire or release air for deflating the corresponding tire. The method includes providing, by an air regulation device, air to the one or more valves of the one or more tires via one or more respective air lines. The method also includes providing, by the air regulation device, air to one or more air suspension devices via the one or more respective air lines. The method also includes communicating, by an electronic control unit (ECU), an instruction causing the one or more tires to inflate or deflate based on a tire air pressure configuration.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

FIG. 1 illustrates vehicles travelling over various road segments, according to various embodiments of the invention.

FIGS. 2A-2B illustrate tires with different air pressures, according to various embodiments of the invention.

DETAILED DESCRIPTION

Figure 2C:
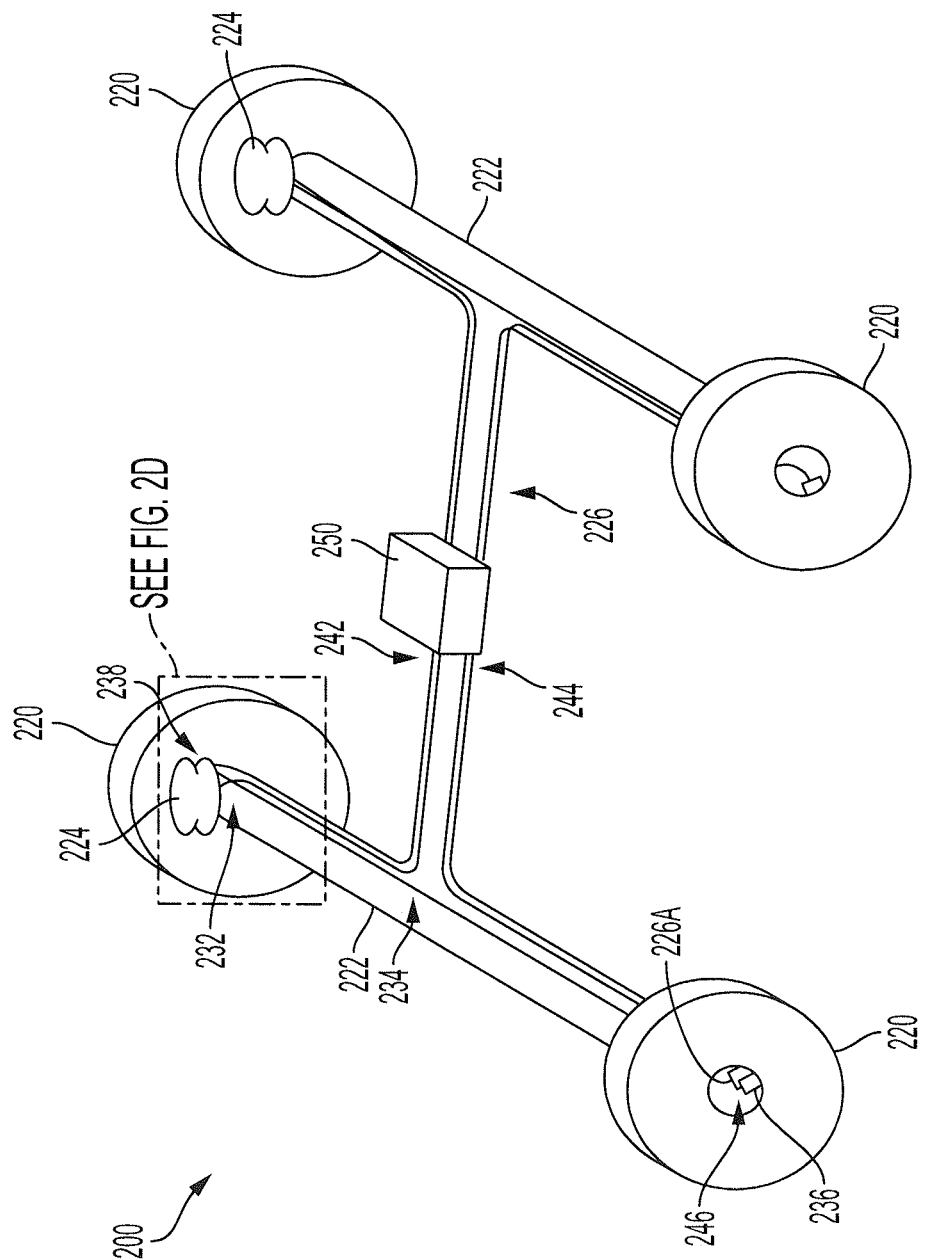
FIGS. 2C-2D illustrate the central tire air inflation system, according to various embodiments of the invention.

Disclosed herein are systems, vehicles, and methods for automatically adjusting tire air pressure of a vehicle. Current conventional vehicles are not capable of adjusting the tire air pressure of the tires automatically. Conventional techniques used by off-road enthusiasts, for example, of lowering tire air pressure to improve surface contact of the tires with the rugged terrain is to manually depress a valve of a tire to release air from the tire, and to re-inflate the tire when off-road driving is completed and driving on paved surfaces is anticipated.

The systems and methods described herein use sensors and processors to detect whether the tire air pressure should be adjusted (either released or inflated) and the tire air pressure is automatically adjusted. The systems and methods described herein use an existing vehicle air regulation device that may also be used to adjust an air suspension device. In this way, existing systems and devices are leveraged to improve the vehicle without introducing substantial cost in manufacturing complexity and materials.

The systems and methods described herein substantially improve vehicle safety and operational efficiency by automatically providing an optimized tire air pressure to the vehicle.

As used herein, "driver" may refer to a human being driving the vehicle when the vehicle is a non-autonomous vehicle, and/or "driver" may also refer to one or more computer processors used to autonomously or semi-autonomously drive the vehicle. "User" may be used to refer to the driver or occupant of the vehicle when the vehicle is a non-autonomous vehicle, and "user" may also be used to refer to an occupant of the vehicle when the vehicle is an autonomous or semi-autonomous vehicle. As used herein, "road segment" may be used to refer to portions of a road or paths of various lengths, without regard to whether the path or road is paved or otherwise altered to accommodate vehicular travel.

FIG. 1 illustrates various road segments and vehicles travelling thereon. A road segment may begin or end at a dividing location, such as an intersection or a change in terrain. There is a first road segment 102, a second road segment 104, a third road segment 106, a fourth road segment 108, and a fifth road segment 110.

The first road segment 102, the second road segment 104, and the third road segment 106 are paved roads. Paved roads may be covered in asphalt or other paving compound to allow any vehicle to safely and comfortably travel over the road. As such, when the vehicle 116 traverses the paved roads, the vehicle 116 may have its tires inflated to a level corresponding to paved roads. Since paved roads are relatively smooth and even, the tires may be inflated in a configuration that optimizes fuel efficiency.

The fourth road segment 108 is an unpaved road or an off-road path. The unpaved road may be a dirt road, a grass road, or any other road that has not been covered in asphalt or other paving compound. When on the unpaved road, the vehicle 116 may have its tires inflated to a level corresponding to unpaved roads. Since unpaved roads are uneven and rough, the tires may be inflated in a configuration that optimizes for control. The air pressure within the tires may be lower when the vehicle 116 is traversing the fourth road segment 108 (unpaved road) than when the vehicle 116 is traversing the first road segment 102, the second road segment 104, or the third road segment 106 (paved roads). The lower air pressure within the tires when travelling on the unpaved road allows the tires to have increased surface area contact with the road, providing for increased control and stability. The higher air pressure within the tires when travelling on the paved road allows the tires to have decreased surface area contact with the road, and increased fuel efficiency.

In addition, when the vehicle 116 includes an air suspension device, the height of the vehicle may be adjusted accordingly. For example, on the paved roads, the air suspension device may be adjusted to lower the height of the vehicle to reduce drag and improve fuel efficiency of the vehicle 116. In another example, on the unpaved roads, the air suspension may be adjusted to raise the height of the vehicle to reduce the risk of an object (e.g., a rock or shrub) damaging the body (e.g., undercarriage) of the vehicle 116. The tire pressure and the height of the vehicle may be associated with each other, so that when the tire pressure is adjusted, the height of the vehicle is also automatically adjusted.

The driver may instruct the vehicle to adjust the air pressure of the tires using an input/output device (e.g., a touchscreen of an infotainment unit or a switch). The driver may specify a target tire pressure for each tire, or the driver may identify a type of road or intended use of the vehicle (e.g., off-road driving) and the vehicle may automatically adjust the air pressure of the tires to a configuration corresponding to the identified type of road or intended use of the vehicle.

In some embodiments, the system automatically inflates or deflates the tires of the vehicle 116 as the vehicle drives across various road segments. For example, the vehicle 116 may have a first tire pressure when the vehicle 116 is traversing the first road segment 102, the second road segment 104, and the third road segment 106, and the vehicle 116 may have a second tire pressure (less than the first tire pressure) when the vehicle 116 is traversing the fourth road segment 108. The system may adjust the tire pressure as the vehicle 116 is travelling, or may wait until the vehicle 116 has come to a complete stop to adjust the tire pressure.

The system may adjust the tire pressure after the vehicle 116 has entered into the new type of road. For example, the vehicle 116 may have the first tire pressure while traversing the first road segment 102, and the vehicle 116 may begin to drive on the fourth road segment 108. When the vehicle 116 stops for the first time while on the fourth road segment 108, the vehicle 116 may then deflate the tires to decrease the tire pressure. The vehicle 116 may detect the new type of road using map data and a location sensor, or other vehicle sensors configured to detect a terrain being driven on.

The system may adjust the tire pressure in anticipation of the vehicle 116 entering into the new type of road. For example, the vehicle 116 may have the first tire pressure while traversing the first road segment 102, and the vehicle 116 may stop at the intersection prior to driving through the intersection to drive on the fourth road segment 108. When the vehicle 116 is stopped at the intersection, the vehicle 116 may then deflate the tires to decrease the tire pressure. The vehicle 116 may anticipate the terrain that will be encountered using a combination of map data, a location sensor, and navigation directions determined for the driver to navigate to a destination.

When the vehicle 116 uses map data and a location sensor to determine the tire pressure to use, the map data may be supplemented with terrain data and/or tire pressure data. The terrain data may indicate a type of terrain or road, and the vehicle 116 may use the terrain data to determine an appropriate tire pressure. The tire pressure data may indicate an ideal tire pressure to be used while traversing the corresponding road, and may have various tire pressures for various types of vehicles and/or makes and models of vehicles. For example, an SUV may have a different tire pressure specification than a sedan, even though they are traversing the same road. In some embodiments, the driver may specify the tire pressure for each type of terrain, each road segment and/or each geographic area. In other embodiments, the tire pressure for each type of terrain, each road segment and/or each geographic area is specified by a manufacturer of the vehicle or a third-party authority.

In some embodiments, the vehicle 116 may slowly and safely adjust the tire pressure while the vehicle 116 is in motion and the tires are turning. The vehicle 116 may gradually adjust tire pressure while the vehicle 116 is moving in anticipation of the vehicle 116 traversing a road segment that has a different tire pressure associated with it than the road segment currently being traversed.

The fifth road segment 110 is a path that is partially or completely submerged in water 114. When on the wet road, the air pressure within the tires may be set to a different air pressure than when the vehicle 116 is on the paved roads or the unpaved road.

In some situations, such as wet conditions, there may be benefits and disadvantages to increased tire pressure and decreased tire pressure. For example, in wet conditions, decreased tire pressure may improve contact with the road, reducing chances of getting stuck in mud, but increased tire pressure may reduce the likelihood of hydroplaning. In these situations where there may be different factors (e.g., intentions of the driver, conditions of the road), the tire pressure of the vehicle 116 may be determined and adjusted on an ad hoc basis based on these factors.

In some embodiments, the system may learn the driver's preferences over time using machine learning or artificial intelligence techniques. For example, the driver (and/or other drivers of other vehicles) may lower tire air pressure whenever the vehicle traverses the fourth road segment 108. When a threshold number or percentage of vehicles traversing the fourth road segment 108 lower tire air pressure, the system may automatically lower tire air pressure when the fourth road segment 108 is traversed.

Machine learning or artificial intelligence techniques may also be used to detect indicators of changes in terrain for automatic adjustment of tire air pressure. For example, image data from onboard vehicle cameras may be analyzed to detect an off-road or paved terrain, and the vehicle's tire air pressure may be adjusted accordingly.

When the vehicle 116 automatically detects the terrain, the vehicle 116 may use any number of vehicle sensors, such as an inertial measurement unit (IMU) configured to detect acceleration, deceleration, roll, pitch, and yaw of a vehicle; a suspension sensor configured to detect a compression of the suspension of the vehicle; a location sensor configured to detect a location of the vehicle; a brake sensor configured to detect brake engagement; an accelerator sensor configured to detect accelerator/throttle engagement; and a traction sensor configured to detect when the tires of the vehicles are losing traction. Various terrain types may have different combinations of associated sensor measurements, and the vehicle 116 may use a combination of detected sensor measurements to determine a terrain currently being driven on. For example, when the IMU detects sporadic changes in roll, pitch, and yaw, when the traction sensor detects frequent loss of traction, and when the suspension sensor detects uneven road levels, the vehicle 116 may detect an off-road (or unpaved road) terrain. A location sensor may also supplement and/or verify the determination made using the other sensors.

Vehicles, such as vehicle 116 may communicate an indication to a remote data server the detected terrain and/or the tire air pressure used in a given road segment. The underlying vehicle telemetry used to determine the terrain may also be communicated to the remote data server. The detected terrain and/or the tire air pressure used in the given road segment may also be supplemented with vehicle data associated with vehicle 116, such as the make, model, year, and/or type of vehicle (e.g., SUV, truck, sedan).

When the remote data server receives a threshold number of determined terrains from various vehicles, the remote data server may provide the terrain to subsequent vehicles traversing the road segment. Similarly, the remote data server may provide the tire pressure to vehicles when a threshold number of tire pressures are provided by various vehicles.

The vehicle may learn, over time, a tire pressure (and/or vehicle height) configuration for a given location or a given terrain, so that the same configuration may be used when the vehicle returns to the given location or the given terrain. The configuration may be based on the past configurations of the driver, past configurations of other drivers, and/or configurations suggested by the vehicle manufacturer. The configuration may be automatically implemented when the vehicle reaches the given location, or the vehicle may prompt the driver to change the tire pressure (and/or vehicle height) when the vehicle reaches the given location. The prompt may be an audible prompt provided using one or more speakers, a visual prompt provided using one or more display units (e.g., infotainment display, heads up display device), and/or a tactile prompt provided using one or more vibration units located in the vehicle (e.g., on the steering wheel, on the driver's seat).

The vehicle may also provide a notification (e.g., an audible prompt, a visual prompt, and/or a tactile prompt as described herein) when the driver instructs the vehicle to configure the tire pressure and/or vehicle height in a manner inconsistent with the vehicle location or detected terrain at the vehicle location. For example, when the vehicle is on an off-road terrain, and the driver instructs the vehicle to maximize the tire air pressure and lower the vehicle height to the lowest height possible, the vehicle may provide a notification instructing the driver that the specifications identified by the driver are inconsistent with the terrain, and to confirm the configuration. This may prevent accidental configuration by the driver. Whether the configuration entered by the driver is inconsistent with the vehicle location or detected terrain may be determined based on past configurations of the driver, past configurations of other drivers, and/or configurations suggested by the vehicle manufacturer for those vehicle locations or detected terrains.

The tire air pressure may also be associated with a driving mode of the vehicle (e.g., sport mode, comfort mode, eco mode). When a driving mode is selected, the vehicle may adjust one or more vehicle operations and the tire air pressure may also be adjusted. One or more vehicle operations that may be adjusted may include adjusting one or more dampers to adjust suspension stiffness or softness, adjusting one or more air suspension devices to adjust vehicle height, adjusting accelerator pedal feel, adjusting brake pedal feel, adjusting steering feel, adjusting traction control, and/or adjusting gear shifting points. The vehicle operations described herein are an example list, and additional aspects of the vehicle operations may also be adjusted.

For example, in a sport mode, the vehicle may tighten suspension and also increase the tire pressure more than a baseline tire pressure level. The air suspension device may also be adjusted to lower the vehicle height. In a comfort mode, the vehicle may loosen suspension and decrease the tire pressure to less than a baseline tire pressure level. In an eco mode, the vehicle may adjust gear shifting points to cause more efficient energy (e.g., fuel or electricity) usage and the tire pressure may be increased to improve energy efficiency.

In some embodiments, when a vehicle speed exceeds a vehicle speed threshold, the tire air pressure is returned to a baseline level. This may serve as a safety feature to ensure that the vehicle is returned to the baseline level in case the driver forgets to switch the tire air pressure back to the baseline level after leaving an off-road area, for example. The baseline level may be specified by the driver, owner of the vehicle, and/or the manufacturer of the vehicle. In some embodiments, when the vehicle is turned on or started, the tire air pressure is set to the baseline level. In some embodiments, upon turning off the vehicle, the last used configuration of the tire air pressure is stored and used when the vehicle is started again.

FIG. 2A illustrates a tire 202 that is inflated a first amount. When the tire 202 is inflated the first amount, it is best used for driving on a relatively smooth, even surface 206, such as a paved road. The tire 202 makes contact 204 with the relatively smooth, even surface 206 and results in an optimal balance of ride, fuel efficiency, and handling.

FIG. 2B illustrates a tire 212 that is inflated a second amount that is less than the first amount. The tire 202 and tire 212 may be the same make and model and size of tire, but may be inflated differently based on the intended usage.

When the tire 212 is inflated the second amount, it is best used for driving on unpaved, uneven road 216. The tire 212 makes contact 214 with the unpaved, uneven road 216. Notably, the contact 214 that the tire 212 makes with the unpaved, uneven road 216 is greater than the contact 204 that the tire 202 makes with the paved road 206.

Figure 2D:
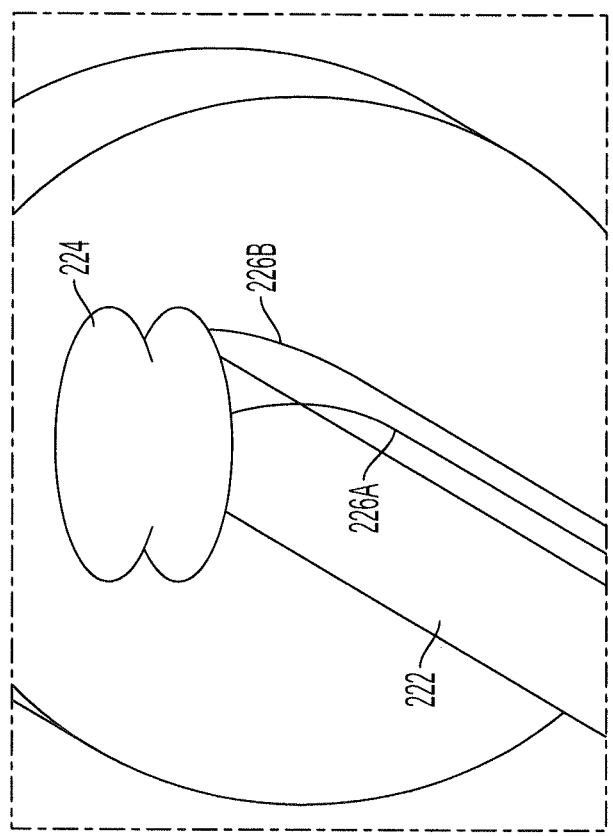

FIGS. 2C-2D illustrate an example central tire inflation system 200. The system 200 includes multiple tires 220 connected to axles 222. Rotational force is transferred to the tires 220 from the engine or motor via the axles 222 to propel the vehicle forward or backward. The tires 220 each have a valve 236 configured to receive air or release air.

The system 200 includes an air suspension device 224 near each of the tires 220. The air suspension device 224 may be inflated or deflated to adjust a height of the vehicle. While the air suspension device 224 is illustrated as a suspension using bellows, any inflatable device may be used. As used herein, "air suspension device" may refer to any of the devices used to adjust the height of the vehicle individually or may be used to describe the devices collectively.

The air suspension device 224 and the valve 236 of each tire 220 is connected to an air controller 250 via air lines 226. The air lines 226 are one or more channels for providing or removing air from the air suspension device 224, as instructed by the air controller 250. The air lines 226 may include suspension air lines 226B that couple the air controller 250 to the air suspension device 224 and tire air lines 226A that couple the air controller 250 to the valves 236 of the tires 220.

In some embodiments, the air lines 226 enter the axle 222 at an opening location 234 near the midline of the vehicle and travel through the axle 222 toward the air suspension device 224 and the tire 220. The suspension air lines 226B may exit the axle 222 at an opening location 232 near the tire 220 and connects to the air suspension device 224. The tire air lines 226A may remain within the axle 222 and connect to the valve 236 via an opening near the center of the wheel upon which the tire is located.

In some embodiments, the air lines 226 travel along an exterior of the axle 222. The suspension air lines 226B may connect to the air suspension device 224 outside of the axle. The tire air lines 226A may enter through the axle 222 at an opening location 232 near the tire 220 and connect to the valve 236 via an opening near the center of the wheel upon which the tire is located.

The suspension air lines 226B may have a first end 238 connected to the air suspension device 224 and a second end 244 opposite the first end 238 connected to the air controller 250. The tire air lines 226A has a first end 246 connected to the tire 220 (via the valve 236) and a second end 242 opposite the first end 246 connected to the air controller 250.

The valves 236 of the tires 220 may be communicatively coupled to a control unit (e.g., an ECU or the air controller 250) and may be instructed to temporarily release air to deflate the tires 220. A valve of the air suspension device 224 may be communicatively coupled to the control unit (e.g., an ECU or the air controller 250) and may be instructed to temporarily release air to deflate the air suspension device 224. These communications may be made wirelessly or via a wire.

Figure 3:
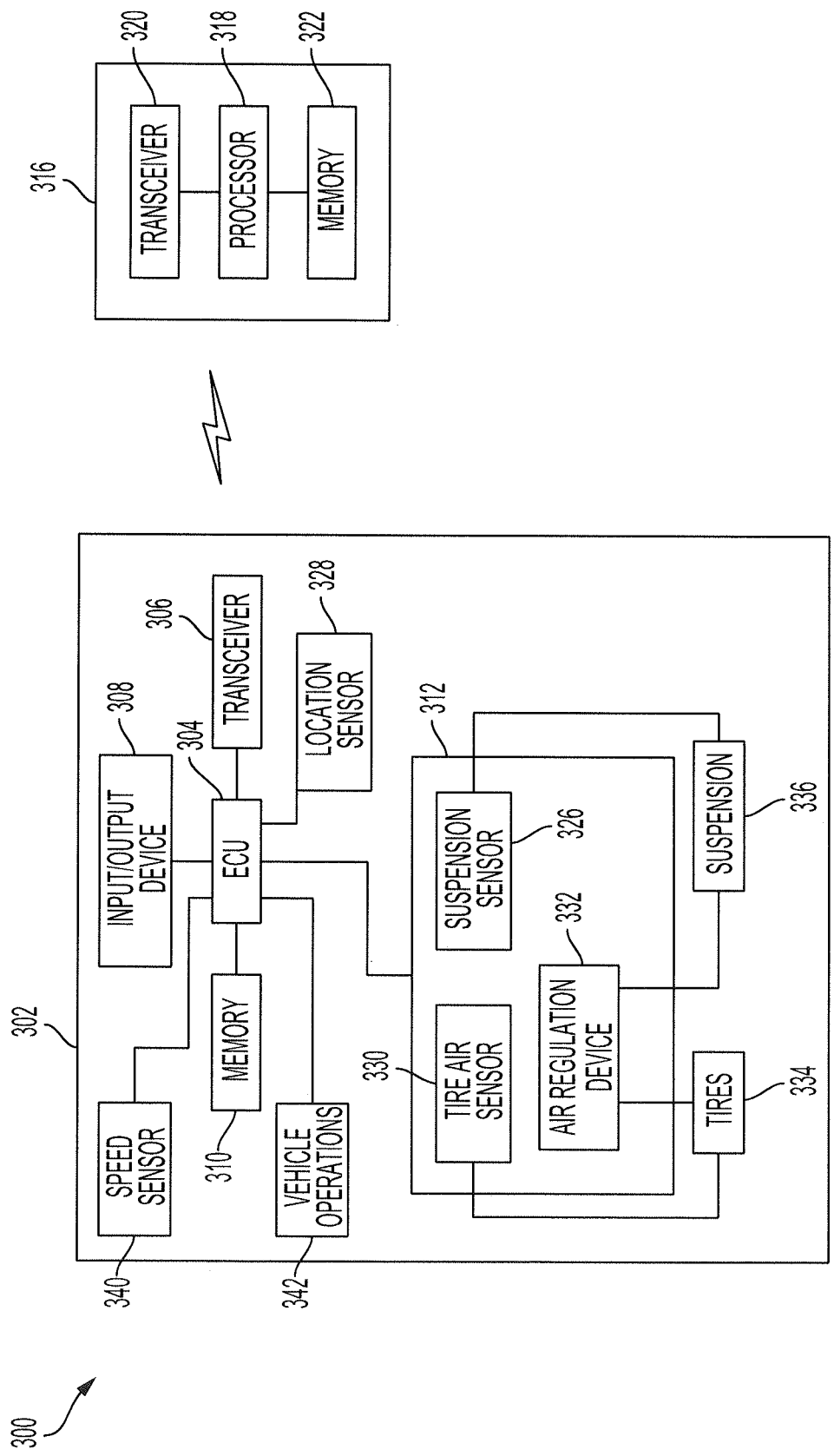
FIG. 3 illustrates a block diagram of the system, according to various embodiments of the invention.

FIG. 3 illustrates a block diagram of the system 300. The system 300 includes a vehicle 302 and a remote data server 316.

The vehicle 302 may have an automatic or manual transmission. The vehicle 302 is a conveyance capable of transporting a person, an object, or a permanently or temporarily affixed apparatus. The vehicle 302 may be a self-propelled wheeled conveyance, such as a car, a sports utility vehicle, a truck, a van or other motor or battery driven vehicle. For example, the vehicle 302 may be an electric vehicle, a hybrid vehicle, a plug-in hybrid vehicle, a fuel cell vehicle, or any other type of vehicle that includes a motor/generator. Other examples of vehicles include bicycles, planes, and any other form of conveyance that is capable of transportation. The vehicle 302 may be a semi-autonomous vehicle or an autonomous vehicle. That is, the vehicle 302 may be self-maneuvering and navigate without human input. An autonomous vehicle may use one or more sensors and/or a navigation unit to drive autonomously.

The vehicle 302 includes an electronic control unit (ECU) 304, an input/output device 308, a transceiver 306, and a memory 310.

Each ECU 304 may be one or more ECUs, appropriately programmed, to control one or more operations of the vehicle. The one or more ECUs 304 may be implemented as a single ECU or in multiple ECUs. The ECU 304 may be electrically coupled to some or all of the components of the vehicle. In some embodiments, the ECU 304 is a central ECU configured to control one or more operations of the entire vehicle. In some embodiments, the ECU 304 is multiple ECUs located within the vehicle and each configured to control one or more local operations of the vehicle. In some embodiments, the ECU 304 is one or more computer processors or controllers configured to execute instructions stored in a non-transitory memory 310. The ECU 304 may utilize artificial intelligence logic and techniques to precisely determine that the vehicle is capable of safely traversing the road segment based on current and past data. The ECU 304 may also use the current condition of the vehicle to identify the vehicle capability assessment to ensure the vehicle is capable of safely traversing the road segment.

The vehicle 302 and one or more other vehicles similar to vehicle 302 may be coupled to a network. The network, such as a local area network (LAN), a wide area network (WAN), a cellular network, a digital short-range communication (DSRC), the Internet, or a combination thereof, connects the vehicle 302 to a remote data server 316.

The transceiver 306 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G, 4G, or 5G). The transceiver 306 may transmit data to and receive data from devices and systems not directly connected to the vehicle. For example, the ECU 304 may communicate with the remote data server 316. Furthermore, the transceiver 306 may access the network, to which the remote data server 316 is also connected. The vehicle 302 may communicate with other vehicles directly or via a network.

The vehicle 302 includes a location sensor 328 configured to detect location data associated with the vehicle 302. The location sensor may be a GPS unit or any other global location detection device. The ECU 304 may use the location data along with the map data stored in the memory 310 to determine a location of the vehicle. In other embodiments, the location sensor 328 has access to the map data and may determine the location of the vehicle and provide the location of the vehicle to the ECU 304.

The location data may be used to determine an air pressure of the tires 334. In some embodiments, the location data is associated with an ideal air pressure for the tires 334, and the ECU 304 instructs the air controller 312 to inflate or deflate the tires 334 accordingly. The association of the ideal air pressure and the location data may be stored locally in memory 310 or may be stored remotely (e.g., memory 322) and accessed by the ECU 304 via transceiver 306. In some embodiments, the location data is associated with a terrain, and the terrain is associated with an ideal air pressure for the tires 334. The association of the location data with the terrain may be stored locally in memory 310 or stored remotely (e.g., memory 322) and accessed by the ECU 304 via transceiver 306. The association of the terrain and the ideal air pressure for the tires 334 may be stored locally in memory 310 or stored remotely (e.g., memory 322) and accessed by the ECU 304 via transceiver 306.

The vehicle 302 includes an air controller 312 (e.g., air controller 250) configured to adjust the air pressure of the tires 334 and/or the suspension 336. The air controller 312 may be controlled by the ECU 304 or may have one or more processors of its own to perform the functions described herein. The air controller 312 includes a tire air sensor 330 connected to the tires 334. The tire air sensor 330 may be one or more sensors configured to detect tire data, including tire air pressure of each of the tires 334.

The air controller 312 also includes a suspension sensor 326 connected to the suspension 336. The suspension sensor 326 may be one or more sensors configured to detect suspension data, including a stroke sensor configured to detect a degree to which the suspension is extended and/or a suspension air pressure sensor configured to detect air pressure of each air suspension device (e.g., air suspension device 224). The tires 334 and the suspension 336 are connected to an air regulation device (or air regulator) 332 configured to adjust (e.g., provide or remove) air within the tires 334 and/or the suspension 336. The air regulation device 332 may be instructed to adjust air within the tires 334 and/or the suspension 336. As described herein, the air controller 312 may also control valves to release air from the tires 334 and/or the suspension 336. The air regulation device 332 may include an air compressor and an air tank to provide the air to the tires 334 and/or suspension 336.

The memory 310 is connected to the ECU 304 and may be connected to any other component of the vehicle. The memory 310 is configured to store any data described herein, such as the map data, the location data, the suspension data, the tire data, the vehicle data, and any data received from the remote data server 316 via the transceiver 306. The vehicle data associated with the vehicle 302 may indicate the features and capabilities of the vehicle 302, and may include any modifications or equipment associated with the vehicle 302. For example, if the vehicle suspension is altered or all-weather tires are installed on the vehicle 302, the vehicle data may be accordingly updated. The vehicle data may be updated via the input/output device 308 or may be automatically detected by vehicle sensors.

The input/output device 308 may be a touchscreen display or a display screen and an input device, such as a keyboard, a microphone, or buttons. The input/output device 308 may be a touchscreen of an infotainment unit of the vehicle 302, a heads-up display, or a combination of a display screen of the infotainment unit and one or more buttons or knobs used to interact with the infotainment unit. The ECU 304 may be configured to render a graphical user interface to facilitate displaying of notifications, such as a notification that the tire pressure is being automatically adjusted.

A vehicle operations array 342 is configured to adjust one or more operations of the vehicle based on a received driving mode (e.g., sport mode, comfort mode, eco mode). The operations of the vehicle may include traction control, suspension, and gear shift points, for example. The tire air pressure may be associated with a driving mode of the vehicle. When a driving mode is selected (via the input/output device 308), the ECU 304 may adjust one or more vehicle operations using the vehicle operations array 342 and the tire air pressure may also be adjusted, as described herein.

A speed sensor 340 is configured to detect a current vehicle speed of the vehicle 302. In some embodiments, when a vehicle speed exceeds a vehicle speed threshold, the tire air pressure is returned to a baseline level. This may serve as a safety feature to ensure that the vehicle is returned to the baseline level in case the driver forgets to switch the tire air pressure back to the baseline level after leaving an off-road area, for example.

The remote data server 316 includes a processor 318, a memory 322, and a transceiver 320. The processor 318 of the remote data server 316 may be one or more computer processors configured to execute instructions stored in non-transitory memory 322.

In some embodiments, the processor 318 of the remote data server 316 may determine an ideal tire air pressure and/or corresponding terrain based on location data received from the vehicle 302. The processor 318 may then provide the determined ideal tire air pressure and/or corresponding terrain to the vehicle 302.

While only one remote data server 316 is shown, any number of remote data servers in communication with each other may be used.

Figure 4:
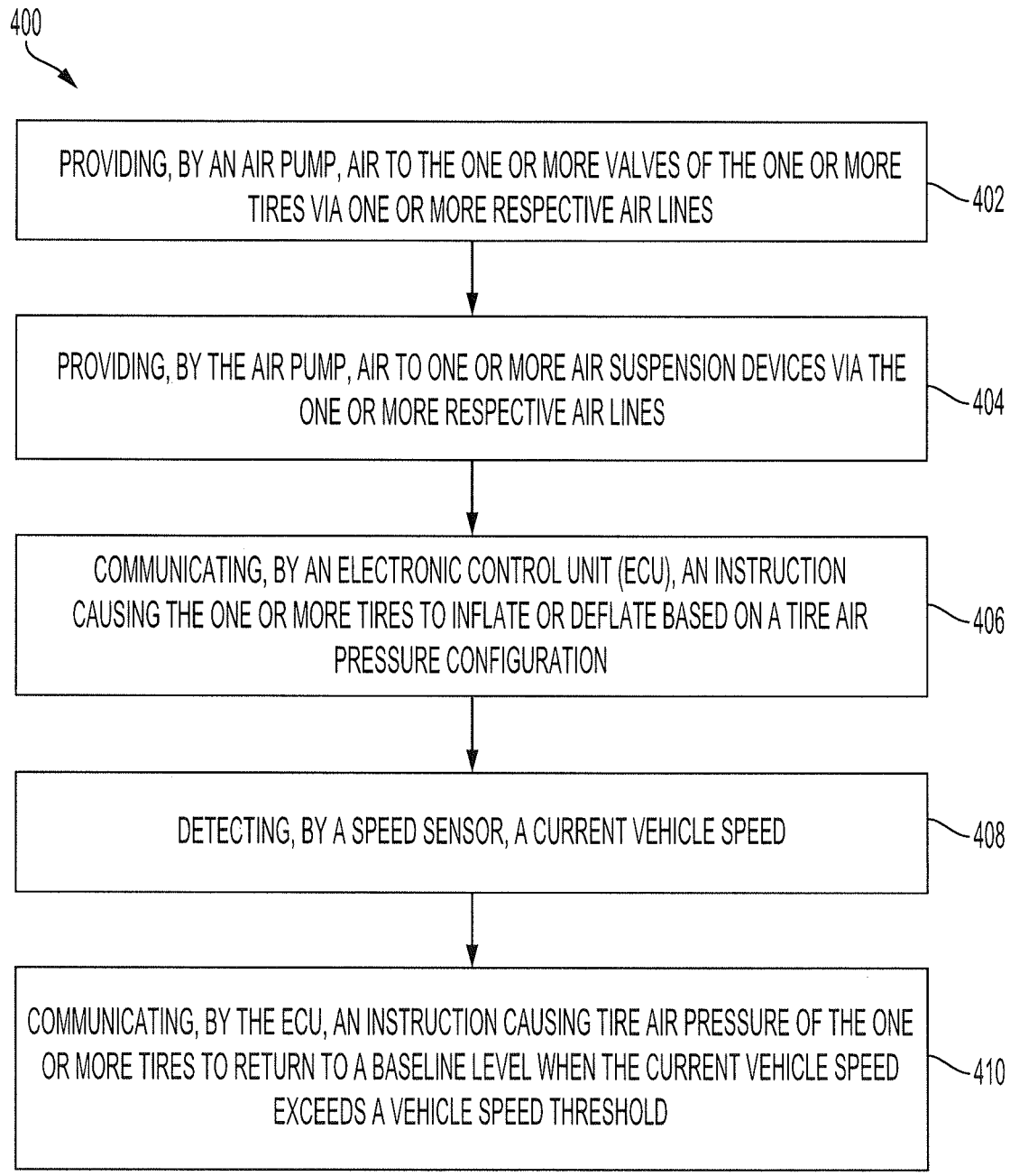
FIG. 4 illustrates a process of the system, according to various embodiments of the invention.

FIG. 4 illustrates a process 400 performed by the system described herein.

An air regulation device (e.g., air regulation device 332) provides air to one or more valves (e.g., tire valve 236) of one or more tires (e.g., tires 334) via one or more respective air lines (e.g., air lines 226) (step 402). The air regulation device also provides air to one or more air suspension devices (e.g., air suspension device 224) via the one or more respective air lines (step 404). In some embodiments, a single air regulation device provides air to the tires and the air suspension devices. In some embodiments, a first air regulation device provides air to the tires and a second air regulation device provides air to the air suspension devices. In some embodiments, the air suspension devices have valves that receive and release air.

An ECU (e.g., ECU 304) communicates an instruction, causing the one or more tires to inflate or deflate based on a tire air pressure configuration (step 406). In some embodiments, the ECU communicates the instruction directly to respective valves or devices. The system may include a separate air controller with its own processing device, and the ECU communicates the instruction to the air controller, which, in turn, communicates the instruction to the appropriate valves and devices for inflating or deflating the tires. Each tire may have its own tire air pressure value in the tire air pressure configuration, or all of the tires may be set to the same tire air pressure value in the tire air pressure configuration.

The tire air pressure configuration may be received by a user via an input/output device (e.g., input/output device 308) or may be automatically triggered based on any number of factors described herein, such as location, detected terrain, weather, traffic, or driving mode received from the driver.

When the tire air pressure configuration is automatically adjusted based on location, a current location of the vehicle may be detected using a location sensor (e.g., location sensor 328) and various locations and corresponding tire air pressure configurations may be stored in memory (e.g., local memory 310 or remote memory 322). When the detected location matches a location stored in memory having a corresponding tire air pressure configuration, the corresponding tire air pressure configuration is used.

When the tire air pressure configuration is automatically adjusted based on detected terrain or environment, a current location of the vehicle may be detected using a location sensor and various locations and corresponding terrain types may be stored in memory (e.g., local memory 310 or remote memory 322). In addition, various terrains and corresponding tire air pressure configurations may also be stored. When the detected location matches a location stored in memory having a corresponding terrain, the corresponding tire air pressure configuration is used for the referenced terrain.

In some embodiments, terrain may be detected by the vehicle using a plurality of sensors (e.g., IMU, traction sensor) and a corresponding tire air pressure configuration may be referenced and implemented.

When the tire air pressure configuration is automatically adjusted based on weather or traffic, a current weather or traffic of the vehicle may be received from a remote data server (e.g., remote data server 316) and various weather or traffic conditions and corresponding tire air pressure configurations may be stored in memory (e.g., local memory 310 or remote memory 322).

When the tire air pressure configuration is automatically adjusted based on a received vehicle driving mode indication, a vehicle driving mode (e.g., sport mode, comfort mode, eco mode) may be received from the driver via an input/output device, and various vehicle driving modes and corresponding tire air pressure configurations may be stored in memory (e.g., local memory 310 or remote memory 322). The ECU 304 references the tire air pressure configuration corresponding to the received vehicle driving mode, and the ECU 304 instructs one or more valves or devices to adjust the tire air pressure of the tires according to the tire air pressure configuration.

A vehicle may have a baseline tire air pressure configuration that may be a general-purpose configuration useful for many different terrains and conditions. The vehicle may use a different tire air pressure configuration, as described herein. However, in the interest of safety, the vehicle may automatically return to the baseline tire air pressure configuration when the vehicle exceeds a threshold vehicle speed, as the driver may have forgotten to change the tire air pressure configuration back to the baseline tire air pressure configuration. A speed sensor (e.g., speed sensor 340) configured to detect a speed of the vehicle may detect a current vehicle speed (step 408). The ECU causes the tires to return to a baseline tire air pressure configuration when the current vehicle speed exceeds a vehicle speed threshold (step 410). The vehicle speed threshold may be stored in memory and may be changed or updated.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for adjusting tire air pressure of one or more tires on a vehicle, the system comprising:
   one or more valves respectively corresponding to the one or more tires, each valve of the one or more valves configured to receive air for inflating a corresponding tire or release air for deflating the corresponding tire;
   an air regulation device configured to provide air to the one or more valves and one or more air suspension devices via one or more respective air lines;
   a plurality of sensors configured to detect sensor data;
   an infotainment unit configured to receive user input specifying a target tire air pressure for each of the one or more tires; and
   an electronic control unit (ECU) coupled to the air regulation device, the plurality of sensors, and the infotainment unit and configured to:
      determine a current terrain type out of three or more terrain types on which the vehicle is being driven in response to detecting a predetermined combination of sensor measurements based on the sensor data,
      determine a tire air pressure configuration corresponding to the determined current terrain type on which the vehicle is being driven and a vehicle height configuration associated with the determined tire air pressure configuration,
      provide a notification to a driver of the vehicle when the target tire air pressure is inconsistent with the determined current terrain type, the notification prompting the driver to confirm the target tire air pressure,
      control the air regulation device to cause the one or more tires to automatically inflate or deflate based on the target tire air pressure when the driver confirms the target tire air pressure, and
      control the air regulation device to cause the one or more air suspension devices to adjust a height of the vehicle based on the target tire air pressure when the driver confirms the target tire air pressure.

2. The system of claim 1, wherein the infotainment unit is further configured to receive user input specifying the tire air pressure configuration for each terrain type of the three or more terrain types.

3. The system of claim 1, further comprising a memory configured to store a plurality of tire air pressure configurations associated with a respective plurality of locations identified by location data.

4. The system of claim 3, wherein at least one tire air pressure configuration of the plurality of tire air pressure configurations is determined based on previously received user input received via the infotainment unit.

5. The system of claim 1, further comprising a memory configured to store data corresponding to a plurality of terrains associated with a respective plurality of locations identified by location data and store a plurality of tire air pressure configurations respectively associated with the plurality of terrains.

6. The system of claim 1, wherein the ECU is further configured to:
   adjust one or more vehicle operations based on a received vehicle driving mode indication, and
   cause the one or more tires to inflate or deflate based on the received vehicle driving mode indication.

7. The system of claim 1, further comprising a speed sensor configured to detect a current vehicle speed, and
   wherein the ECU is further configured to cause the tire air pressure of the one or more tires to return to a baseline level when the current vehicle speed exceeds a vehicle speed threshold.

8. A vehicle having one or more tires, the vehicle comprising:
   one or more valves respectively corresponding to the one or more tires, each valve of the one or more valves configured to receive air for inflating a corresponding tire or release air for deflating the corresponding tire;

an air regulation device configured to provide air to the one or more valves and one or more air suspension devices via one or more respective air lines;

a plurality of sensors configured to detect sensor data;

an infotainment unit configured to receive user input specifying a target tire air pressure for each of the one or more tires; and an electronic control unit (ECU) coupled to the air regulation device, the plurality of sensors, and the infotainment unit and configured to:
determine a current terrain type out of three or more terrain types on which the vehicle is being driven in response to detecting a predetermined combination of sensor measurements based on the sensor data,
determine a tire air pressure configuration corresponding to the determined current terrain type on which the vehicle is being driven,
provide a notification to a driver of the vehicle when the target tire air pressure is inconsistent with the determined current terrain type, the notification prompting the driver to confirm the target tire air pressure, and
control the air regulation device to cause the one or more tires to automatically inflate or deflate based on the target tire air pressure when the driver confirms the target tire air pressure to adjust a contact surface area of the one or more tires and to cause the one or more air suspension devices to adjust a height of the vehicle based on the target tire air pressure when the vehicle comes to a first stop after the driver confirms the target tire air pressure.

9. The vehicle of claim 8, wherein the infotainment unit is further configured to receive user input specifying the tire air pressure configuration for each terrain type of the three or more terrain types.

10. The vehicle of claim 8, further comprising a memory configured to store a plurality of tire air pressure configurations associated with a respective plurality of locations identified by location data.

11. The vehicle of claim 10, wherein at least one tire air pressure configuration of the plurality of tire air pressure configurations is determined based on previously received user input received via the infotainment unit.

12. The vehicle of claim 8, further comprising a memory configured to store data corresponding to a plurality of terrains associated with a respective plurality of locations identified by location data and store a plurality of tire air pressure configurations respectively associated with the plurality of terrains.

13. The vehicle of claim 8, wherein the ECU is further configured to:
adjust one or more vehicle operations based on a received vehicle driving mode indication, and
cause the one or more tires to inflate or deflate based on the received vehicle driving mode indication.

14. The vehicle of claim 8, further comprising a speed sensor configured to detect a current vehicle speed, and
wherein the ECU is further configured to cause tire air pressure of the one or more tires to return to a baseline level when the current vehicle speed exceeds a vehicle speed threshold.

15. A method for adjusting tire air pressure of one or more tires on a vehicle having one or more valves respectively corresponding to the one or more tires, each valve of the one or more valves configured to receive air for inflating a corresponding tire or release air for deflating the corresponding tire, the method comprising:
providing, by an air regulation device, air to the one or more valves and one or more air suspension devices via one or more respective air lines;
detecting, by a plurality of sensors, sensor data;
detecting, by an electronic control unit (ECU) coupled to the air regulation device and the plurality of sensors, a predetermined combination of sensor measurements based on the sensor data;
determining, by the ECU, a current terrain type out of three or more terrain types on which the vehicle is being driven based on the detected predetermined combination of sensor measurements;
determining, by the ECU, a tire air pressure configuration corresponding to the determined current terrain type on which the vehicle is being driven;
receiving, by an infotainment unit coupled to the ECU, user input specifying a target tire air pressure for each of the one or more tires;
providing, by the ECU, a notification to a driver of the vehicle when the target tire air pressure is inconsistent with the determined current terrain type, the notification prompting the driver to confirm the target tire air pressure,
controlling, by the ECU, the air regulation device to cause the one or more tires to automatically inflate or deflate based on the target tire air pressure when the driver confirms the target tire air pressure to adjust a contact surface area of the one or more tires; and
controlling, by the ECU, the air regulation device to cause the one or more air suspension devices to adjust a height of the vehicle based on the target tire air pressure when the driver confirms the target tire air pressure.

16. The method of claim 15, further comprising receiving, by the infotainment unit, user input specifying the tire air pressure configuration for each terrain type of the three or more terrain types.

17. The method of claim 15, further comprising storing, by a memory, a plurality of tire air pressure configurations associated with a respective plurality of locations identified by location data.

18. The method of claim 15, further comprising:
storing, by a memory, data corresponding to a plurality of terrains associated with a respective plurality of locations identified by location data; and
storing, by the memory, a plurality of tire air pressure configurations respectively associated with the plurality of terrains.

19. The method of claim 15, further comprising:
adjusting, by the ECU, one or more vehicle operations based on a received vehicle driving mode indication; and
instructing, by the ECU, to cause the one or more tires to inflate or deflate based on the received vehicle driving mode indication.

20. The method of claim 15, further comprising:
detecting, by a speed sensor, a current vehicle speed; and
communicating, by the ECU, an instruction to cause the tire air pressure of the one or more tires to return to a baseline level in response to the current vehicle speed exceeding a vehicle speed threshold.

* * * * *